J. W. LOUGHLIN.
MEASURING DEVICE.
APPLICATION FILED AUG. 1, 1911.
1,102,771.
Patented July 7, 1914.
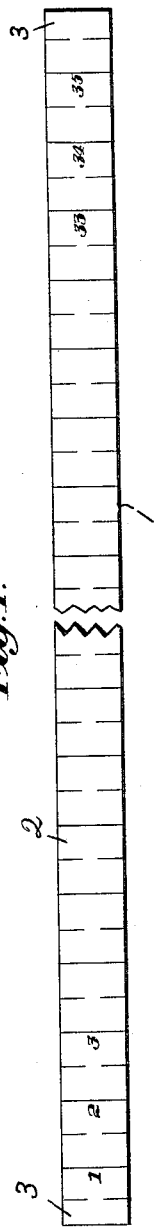
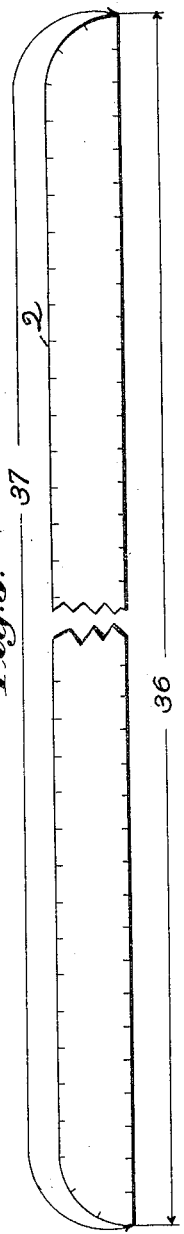

UNITED STATES PATENT OFFICE.

JAMES W. LOUGHLIN, OF JAMAICA PLAIN, MASSACHUSETTS.

MEASURING DEVICE.

1,102,771.　　　　　Specification of Letters Patent.　　Patented July 7, 1914.

Application filed August 1, 1911. Serial No. 641,729.

*To all whom it may concern:*

Be it known that I, JAMES W. LOUGHLIN, a citizen of the United States, and a resident of Jamaica Plain, county of Suffolk, State of Massachusetts, have invented an Improvement in Measuring Devices, of which the following description, in connection with the accompanying drawings, is a specification, like characters on the drawings representing like parts.

This invention relates to measuring devices and aims to provide an improved form of such device for measuring not only rigid matter but one especially adapted for measuring pliable material, by so fashioning the ends of the device that it will be natural and easy to measure material correctly thereby.

In the drawing of one embodiment of my invention selected for illustration and description, Figure 1 is a plan thereof; Fig. 2 is a side elevation; Fig. 3, a side view of a modified form of the invention.

Referring to Fig. 1, my improved measuring device is shown as embodied in a unit three feet in length, or, as commonly known, a yard-stick, although the device may be of any desired length, and it may also be of flexible or pliable material for more convenient use in some instances. Herein I have shown a stick 1 which may be of any desired material, as metal or wood, and of any desired dimension or configuration in cross section, in this case rectangular. The upper face 2 of the stick is substantially flat throughout the greater portion of its length, but toward each end thereof, said upper face 2 is curved downwardly, at any convenient angle, and so fashioned that the fingers holding the material naturally follow closely the inclined surfaces of the ends 3 of the stick and stop at the base of each inclined end of the stick, giving the correct measure for that measuring surface.

In Figs. 1 and 2, I have shown in plan and side elevation, respectively, a yard stick having the ends constructed substantially as described and measuring 36 inches on its upper face over all and provided with a suitable measuring scale. This form of my invention may obviously be embodied in a stick measuring any desired length on its upper face from one end to the other, and also any desired length less than the length of the upper face, on the lower face.

In Fig. 3, I have shown a modified form of my invention wherein the stick is so proportioned that it measures 37 inches from end to end on its upper face, and somewhat less, as, for instance, 36 inches from end to end on its lower face, and each face may be divided into any desired units of measurement. This is a convenient form of the invention for use at "sales" when, for instance, it is desired to give a customer an additional quantity of material for the price of a lesser quantity. Therefore, with a measuring device as shown in Figs. 1, 2 and 3, one may measure a given length, for instance, 36 or 37 inches on the upper face and a less length on the lower face, at his election.

In the use of the foregoing forms above mentioned it has been found by actual use that the average salesman will naturally give substantially correct measurement while in the use of the ordinary yard stick the measure overruns regularly. This amount that the measured material overruns the correct measure depends upon the care used by the salesman. A salesman having nothing adapted to act as a stop for his fingers when sliding them along an ordinary yard stick, will not naturally stop at the end of the yard stick and measure a correct amount of material.

In the use of a common yard-stick or measure of any length, it is customary to position one edge or end of the material to be measured opposite one end of the measure and then to determine the point at which the material is to be cut or determine the opposite point of measurement or computation by laying the material on the upper face of the measure and dropping the fingers holding the material more or less closely to the opposite end of said stick or measure. If, in determining this point, the fingers are placed closely adjacent or against the end of the stick then said point of measurement will indicate substantially the correct measurement; but if, as is the usual case, the fingers together with the material are dropped carelessly beyond the end of the stick, then said point of measurement or computation is not substantially accurately determined and the correct measure is not indicated. This results in an excess of measurement, such excess being determined by the care or rather want of care with which the second or opposite point of measurement or computation at the opposite end of the stick is determined. It is conceded and admitted by the heads of some of our largest mercantile establishments that the carelessness in thus measuring goods and material is very great, and that such carelessness costs the establishments thousands of dollars yearly, which represents the over-measurement of goods and material by salesmen in the manner specified. While the over-measurement and consequent loss noted above is usually taken care of in fixing the price of the material, it is nevertheless a serious drawback and one which all establishments would be glad to overcome, in order that the purchaser might get exactly what he is entitled to in the quantity of measured material and thus enable the price thereof to be more accurately fixed and proportioned to the intrinsic value of the goods without it being necessary to fix said price to cover loss occasioned in the manner indicated.

Doubtless other modifications of my invention may be made without departing from the spirit and scope of the invention.

Claim:

A measuring member having a flat, scaled, rigid-material-measuring lower face one unit in length, a scaled, flexible-material-measuring upper face substantially parallel with the lower face and but slightly spaced therefrom throughout the greater portion of its length, said upper face terminating in downwardly sloping ends, the length of the upper face and its downwardly sloping ends exceeding that of the lower face by a slight extent constituting a predetermined divisional portion of such unit whereby the lower face may be used to measure a unit of length of rigid material and the upper face may be used to measure a predetermined longer portion of flexible material.

In testimony whereof, I have signed my name to this specification, in the presence of two subscribing witnesses.

JAMES W. LOUGHLIN.

Witnesses:
 EVERETT S. EMERY,
 ROBERT H. KAMMLER.

Copies of this patent may be obtained for five cents each, by addressing the "Commissioner of Patents, Washington, D. C."

Correction in Letters Patent No. 1,102,771.

It is hereby certified that in Letters Patent No. 1,102,771, granted July 7, 1914, upon the application of James W. Loughlin, of Jamaica Plain, Massachusetts, for an improvement in "Measuring Devices," an error appears in the printed specification requiring correction as follows: Page 1, line 14, for the word "matter," read *material;* and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*